US009765247B2

(12) United States Patent
Mahdi et al.

(10) Patent No.: US 9,765,247 B2
(45) Date of Patent: Sep. 19, 2017

(54) SILYL TERMINATED PREPOLYMERS, METHOD FOR MAKING THEM AND ADHESIVE COMPOSITIONS MADE THEREFROM

(71) Applicant: Dow Global Technologies LLC, Midland, MI (US)

(72) Inventors: Syed Z. Mahdi, Rochester Hills, MI (US); Susan P. Sevidal, Sterling Heights, MI (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 299 days.

(21) Appl. No.: 14/467,746

(22) Filed: Aug. 25, 2014

(65) Prior Publication Data
US 2015/0068661 A1 Mar. 12, 2015

Related U.S. Application Data

(60) Provisional application No. 61/876,442, filed on Sep. 11, 2013.

(51) Int. Cl.
*C09J 175/08* (2006.01)
*C08G 18/10* (2006.01)
*C09J 5/00* (2006.01)
*C08G 18/48* (2006.01)
*C08G 18/76* (2006.01)
*C03C 27/00* (2006.01)
*C03C 27/04* (2006.01)
*C09J 183/16* (2006.01)

(52) U.S. Cl.
CPC ............ *C09J 175/08* (2013.01); *C08G 18/10* (2013.01); *C08G 18/4825* (2013.01); *C08G 18/7671* (2013.01); *C09J 5/00* (2013.01); *C03C 27/00* (2013.01); *C03C 27/048* (2013.01); *C09J 183/16* (2013.01)

(58) Field of Classification Search
CPC ................................ C09J 175/08; C09J 183/16
See application file for complete search history.

(56) References Cited

U.S. PATENT DOCUMENTS

| | | | |
|---|---|---|---|
| 3,627,722 A | 12/1971 | Seiter | |
| 3,632,557 A * | 1/1972 | Bridgewater et al. . | C08G 18/10 528/28 |
| 3,707,521 A | 12/1972 | Santis | |
| 3,779,794 A | 12/1973 | De Santis | |
| 3,971,751 A | 7/1976 | Isayama et al. | |
| 4,374,237 A | 2/1983 | Berger et al. | |
| 4,525,511 A | 6/1985 | Kirby et al. | |
| 4,625,012 A | 11/1986 | Rizk et al. | |
| 4,645,816 A | 2/1987 | Pohl et al. | |
| 5,922,809 A | 7/1999 | Bhat et al. | |
| 6,355,127 B1 | 3/2002 | Mahdi et al. | |
| 6,503,995 B2 | 1/2003 | Tsuji et al. | |
| 6,828,403 B2 | 12/2004 | Mahdi et al. | |
| 2005/0215701 A1 | 9/2005 | Porsch et al. | |
| 2006/0135709 A1 | 6/2006 | Hasegawa et al. | |
| 2012/0238695 A1 | 9/2012 | Zander et al. | |

FOREIGN PATENT DOCUMENTS

| | | | |
|---|---|---|---|
| EP | 0931800 A1 | | 7/1999 |
| WO | 2011/150161 A2 | | 12/2011 |
| WO | 2012/003212 | * | 1/2012 |
| WO | 2012003187 A1 | | 1/2012 |
| WO | 2012003212 A1 | | 1/2012 |
| WO | 2012003216 A1 | | 1/2012 |

* cited by examiner

*Primary Examiner* — Margaret Moore
(74) *Attorney, Agent, or Firm* — The Dobrusin Law Firm, P.C.

(57) ABSTRACT

The invention is an adhesive composition comprising a silyl terminated prepolymer having a number molecular weight average (Mn) of about 8,000 to about 80,000 g/mole, a filler, and a silanol condensation reaction catalyst. The silyl terminated prepolymer is comprised of a polymeric backbone of alkylene oxide and at least three urethane groups and at least two terminal groups comprised of a silicon atom having at least two alkoxy silane groups, wherein each silicon atom in the terminal groups is separated from the urethane groups in the polymeric backbone by an amount of alkylene oxide that has a molecular weight of 200 to 15,000 g/mole.

14 Claims, No Drawings

SILYL TERMINATED PREPOLYMERS, METHOD FOR MAKING THEM AND ADHESIVE COMPOSITIONS MADE THEREFROM

FIELD OF INVENTION

The invention relates to silyl terminated prepolymers useful in adhesive for bonding glass. In particular, the invention is useful to bond glass into vehicles and buildings.

BACKGROUND OF INVENTION

In automobile factories, windows are installed using robots and computer controlled processing which facilitates the use of a variety of high performance adhesives, for instance, nonconductive adhesives and high modulus adhesives. These adhesives have to be storage stable and be readily applied under high shear, for example, to a windshield, while retaining the bead shape so that the windshield can be properly fitted to the automobile. This typically has been achieved by one part moisture curable polyurethane prepolymer based adhesives having fillers, with the prepolymers having sufficient molecular weight, so that they are still pumpable and can be applied to the windshield without sagging or stringing in the time it takes to place the windshield on the automobile. These adhesives contain free isocyanate groups that are regulated and will be subject to more stringent regulation.

Silane modified polymers (SMPs) have been used to replace the moisture curable polyurethane based adhesives. SMPs generally are comprised of flexible polymeric backbones that are terminated by moisture reactive (hydrolyzable) silane terminal groups. SMPs, generally, have been made by three routes. The first, illustrated by U.S. Pat. No. 3,971,751, involves hydrosilylating a silicon hydride having hydrolyzable silyl groups with an allyl terminated polyether, where the allyl terminated polyether was formed from a polyether polyol. Unfortunately, these SMPs tend to be expensive due to the cost to fabricate the allyl terminated polyether due to the use of chlorine and alkali that must be removed and disposed. The second, illustrated by U.S. Pat. No. 3,632,557, generally involves reacting an aminosilane with an isocyanate terminated prepolymer resulting in trialkoxysilyl end groups with polyether polymer backbones containing urea linkages. Adhesives with these prepolymers tend to have high viscosities and low elongation. The third, illustrated by U.S. Pat. Nos. 4,625,012 and 6,355,127 involves reacting an isocyanato organosilane with a polyurethane having terminal active hydrogens. Likewise, these have suffered from high viscosities and low elongations.

Recently, PCT Appl, Nos. WO 2012/003212, WO 2012/003216, and WO 2012/003187 have described hydrosilylating a silicon hydride having hydrolyzable silyl groups with an allyl terminated polyether, where the polyether has only one allyl terminal group and the other terminal group is an alcohol. After hydrosilylation, the terminal alcohol is reacted with a diisocyanate resulting in urethane linkage and isocyanate terminal group. This is then reacted with a polyether polyol to form SMPs.

What is needed is a SMP composition that is useful as an adhesive for bonding glass into a structure avoiding some of shortcomings they have exhibited such as those described above.

SUMMARY OF INVENTION

A first aspect of the invention is an adhesive composition comprising:

a) a silyl terminated prepolymer having a number molecular weight average (Mn) of about 8,000 to about 80,000 g/mole and being comprised of:
  (i) a polymeric backbone of alkylene oxide and at least three urethane groups, and
  (ii) at least two terminal groups comprised of a silicon atom having at least two alkoxy silane groups, wherein each silicon atom in the terminal groups is separated from the urethane groups in the polymeric backbone by an amount of alkylene oxide that has a molecular weight of 200 to 15,000 g/mole, b) a filler, and c) a silanol condensation reaction catalyst.

A second aspect of this invention is a method of forming a silyl terminated prepolymer comprising, a) mixing:
  (i) a polyoxyalkylene prepolymer terminated by a hydrolyzable silane and a hydroxyl group, and
  (ii) an isocyanate terminated prepolymer having a number average molecular weight of 4,000 to 60,000 g/mole and at least a portion being comprised of a polymeric backbone comprising alkylene oxide groups and at least one urethane group, and b) reacting the hydroxyl group of polyoxyalkylene prepolymer with the isocyanate of the isocyanate terminate prepolymer to form a silyl terminated prepolymer having a number molecular weight average (Mn) of about 8,000 to about 80,000 g/mole and being comprised of:
  (i) a polymeric backbone of alkylene oxide and at least three urethane groups, and
  (ii) at least two terminal groups comprised of a silicon atom having at least two alkoxy silane groups, wherein each silicon atom in the terminal groups is separated from the urethane groups in the polymeric backbone by an amount of alkylene oxide that has a molecular weight of 200 to 15,000 g/mole.

A variety of substrates may be bonded together using the adhesive composition and adhesive composition comprised of the silyl terminated prepolymer. Examples include plastics, glass, wood, ceramics, metal, coated substrates, such as plastics with an abrasion resistant coating disposed thereon, and the like. The compositions of the invention may be used to bond similar and dissimilar substrates together. The compositions are especially useful for bonding glass or a plastic with an abrasion resistant coating disposed thereon to other substrates such as vehicles and buildings. The compositions of the invention are also useful in bonding parts of modular components together, such as vehicle modular components. The glass or plastic with an abrasion resistant coating disposed thereon can be bonded to coated and uncoated portions of vehicles.

It has been surprisingly discovered that the adhesive composition of the first aspect of the invention has improved pumpability, elongation, sag and adhesion compared to other SMP adhesive compositions. It is not understood why, but without being limiting in any way, it is believed to be due to sufficient separation of urethane from the terminal hydrolyzable silane groups and the presence of further urethane groups within the polymeric backbone without isocyanate side reactions such as allophonate, biurets and ureas. Likewise, the method to make the linear silyl terminated prepolymer has been found to realize a prepolymer useful to make an improved adhesive composition, because, it is believed, without being limiting, to reduced side isocyanate reactions, which may be detrimental to pumpability and elongation characteristics.

Furthermore, the adhesive demonstrates rapid strength development which facilitates rapid drive away times of preferably one hour, and more preferably 30 minutes, after application of the adhesive at temperatures of from about 0° F. (−18° C.) to about 115° F. (46° C.). In particular, windshields installed under such conditions meet United States Federal Motor Vehicle Safety Standard (FMVSS) 212.

DETAILED DESCRIPTION OF INVENTION

The adhesive composition of the invention is comprised of a particular silyl terminated prepolymer. This silyl terminated prepolymer is made by mixing a hydroxyl terminated organosilane such as those described by WO 2012/003212 in paragraphs 5-27 in which a hydroxyl terminated allyl compound is hydrosilylated with an organosilicon compound having a hydrogen-silicon bond and a hydrolyzable silyl group. Generally, the organosilicon compound may be represented by the general formula (I):

$$H-(Si(R^1_{2-b})(X_b)O)_m Si(R^2_{3-a})X_a \quad (I)$$

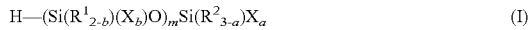

where $R^1$ and $R^2$ are the same or different and each represents an alkyl group containing 1 to 20 carbon atoms, an aryl group containing 6 to 20 carbon atoms or an aralkyl group containing 7 to 20 carbon atoms or a triorganosiloxy group represented by $R^3_3SiO-$ and, when there are a plurality of $R^1$ or $R^2$ groups, they may be the same or different; $R^3$ is a univalent hydrocarbon group containing 1 to 20 carbon atoms and the three $R^3$ groups may be the same or different with one another; X represents a hydroxyl group or a hydrolyzable group and, when there are two or more X groups, they may be the same or different with each other or one another; a represents 0, 1, 2 or 3 and b represents 0, 1 or 2; b's in the m of $-Si R^1_{2-b})(X_b)O$ groups may be the same or different with each other or one another; and m represents an integer from 0 to 19 provided that the relation a+Σb≥1 should be satisfied.

The hydrolyzable group represented by X may be any of those hydrolyzable groups known in the art, for example, halogen atoms and alkoxy, acyloxy, ketoximato, amino, amido, acid amide, aminoxy, mercapto and alkenyloxy groups. Among them, alkoxy groups such as methoxy, ethoxy, propoxy and isopropoxy are preferred in view of their mild hydrolyzability and the ease of handling. One to three such hydrolyzable groups may be bonded to one silicon atom and the sum (a+Σb) is preferably 1 to 5. When there are two or more hydrolyzable groups, they may be the same or different. The number of silicon atoms in the crosslinkable silyl group may be about 1 to 30.

In some embodiments, the compound having a hydrogen-silicon bond and a crosslinkable silyl group in each molecule represented by the above general formula (I) may include the compounds represented by the general formula (II):

$$H-Si(R^4_{3-c})(X_c) \quad II$$

wherein $R^4$ represents an alkyl containing 1 to 20 carbon atoms, an aryl group containing 6 to 20 carbon atoms or an aralkyl group containing 7 to 20 carbon atoms or a triorganosiloxy group represented by $R^3_3SiO-$ and, when there are a plurality of $R^4$ groups, they may be the same or different; $R^3$ is a univalent hydrocarbon group containing 1 to 20 carbon atoms and the three $R^3$ groups may be the same or different with one another; X represents a hydroxyl group or a hydrolyzable group and, when there are two or more X groups, they may be the same or different; and c represents 1, 2 or 3.

As specific examples of the compound having a hydrogen-silicon bond and a crosslinkable silyl group in each molecule, there may be mentioned: halosilanes such as trichlorosilane, methyldichlorosilane, dimethylchlorosilane, phenyldichlorosilane, trimethylsiloxymethylchlorosilane and 1,1,3,3-tetramethyl-1-bromodisiloxane; alkoxysilanes such as trimethoxysilane, triethoxysilane, methyldiethoxysilane, methyldimethoxysilane, phenyldimethoxysilane, trimethylsiloxymethylmethoxysilane and trimethylsiloxydiethoxysilane; acyloxysilanes such as methyldiacetoxysilane, phenyldiacetoxysilane, triacetoxysilane, trimethylsiloxymethylacetoxysilane and trimethylsiloxydiacetoxysilane; ketoximatosilanes such as bis(dimethyl ketoximato)methylsilane, bis(cyclohexyl ketoximato)methylsilane, bis(diethyl ketoximato)trimethylsiloxysilane, bis(methyl ethyl ketoximato)methylsilane and tris(acetoximato)silane and; alkenyloxysilanes such as methylisopropenyloxysilane; and the like. Preferred among them from the mild reactivity and ease of handling viewpoint are alkoxysilanes such as methyldimethoxysilane, trimethoxysilane, methyldiethoxysilane and triethoxysilane; and halosilanes such as trichlorosilane and methyldichlorosilane.

The hydroxyl and allyl terminated polyoxyalkylene compounds may be any such as described by paras. 9-20 of WO 2011/150161 or column 5, line 8 to column 6, line 35 of U.S. Pat. No. 6,503,995.

Generally, the hydroxyl and allyl terminated polyoxyalkylene compound (i.e., having an unsaturated group and an alcoholic hydroxyl group in each molecule) may have a number average molecular weight of between about 100 and about 30,000. All subranges from 100 to 30,000 are included herein and disclosed herein; for example, the number average molecular weight can be from a lower limit of 100, 200, 300, 400, 500, 600, 700, 800, 900, 1,000, 1,250, 1,500, or 1,750 to, independently, an upper limit of 1,000, 1,250, 1,500, 1,750, 2,000, 2,500, 3,000, 3,500, 4,000, 4,500, 5,000, or 10,000.

The number average molecular weight can be determined by measuring the terminal groups. Specifically, when the polyoxyalkylene polymer is linear or branched type polymer, the molecular weight can be determined by obtaining a hydroxyl value (OHV; meq/g) per a unit weight and an unsaturated value (IV; meq/g) from a known method, followed by calculating it with the formula: 2000/(IV+OHV). Alternatively, the number average molecular weight can be determined by gel permeation chromatography using PEG standards.

The unsaturated polyoxyalkylene compound may be hydrosilylated by reacting the polyoxyalkylene polymers with a compound having a hydrogen-silicon bond and a crosslinkable silyl group in the presence of a hydrosilylation catalyst. This hydrosilyation forms a polyoxyalkylene terminated by a hydrolyzable silane and a hydroxyl group (herein "OH terminated polyoxyalkylene") as described in paras 30-32 in WO2011/150161 and column 11, line 54 to column 12, line 52 of U.S. Pat. No. 6,503,995.

The OH terminated polyoxyalkylene is reacted with an isocyanate polyoxyalkylene terminated precursor prepolymer ("isocyanate terminated prepolymer") to form a silyl terminated prepolymer. The isocyanate terminated prepolymer generally has about 0.8 percent by weight or greater free isocyanate based on the weight of the prepolymer. Preferably the amount of free isocyanate is about 0.9 percent by weight or greater to about 4.0 percent by weight or less, more preferably about 3.5 or less, even more preferably about 3.0 percent by weight or less, and even more preferably about 2.6 percent by weight or less of free isocyanate. Above 4.0 percent by weight, the adhesives prepared from the prepolymer may demonstrate lap shear strengths after 60 minutes that may be too low for the intended use. Below about 0.8 percent by weight, the prepolymer viscosity may be too high to allow for effective pumping of the silyl terminated prepolymer that is formed.

The isocyanate terminated prepolymer generally exhibits a viscosity that is about 100,000 centipoise (100 Pa s) or less and more preferably about 50,000 centipoise (50 Pa s) or less, and most preferably about 30,000 centipoise (30 Pa s) or less and about 1,000 centipoise (1 Pa s) or greater. The viscosity used herein is Brookfield viscosity determined using a number 5 spindle. The viscosity of the adhesive can be adjusted with fillers, although the fillers generally do not improve the green strength of the final adhesive. Below about 1,000 centipoise (1 Pa s), the adhesive prepared from the prepolymer may exhibit poor green strength. Above about 100,000 centipoise (100 Pa s), the prepolymer may be unstable and hard to dispense.

Preferable polyisocyanates for use in preparing the isocyanate terminated prepolymer include those disclosed in U.S. Pat. No. 5,922,809 at column 3, line 32 to column 4, line 24, incorporated herein by reference. Preferably, the polyisocyanate is an aromatic or cycloaliphatic polyisocyanate such as diphenylmethane-4,4'-diisocyanate, isophorone diisocyanate, tetramethylxylene diisocyanate, and is most preferably diphenylmethane-4,4'-diisocyanate. The diols and triols are generically referred to as polyols.

The isocyanate terminated prepolymers are made from polyols such as diols and triols corresponding to the polyols described in U.S. Pat. No. 5,922,809 at column 4, line 60 to column 5, line 50, incorporated herein by reference. The polyols (diols and triols) are polyether polyols and more preferably polyoxyalkylene oxide polyols. The most preferred triols are ethylene oxide-capped polyols prepared by reacting glycerin with propylene oxide, followed by reacting the product with ethylene oxide. Preferably, the polyether is chosen to decrease the polarity of the prepolymer. A significant factor in determining the polarity of the prepolymer is the amount of ethylene oxide units in the polyether used to prepare the isocyanate terminated prepolymer. Preferably, the ethylene oxide content in the prepolymer is about 3 percent by weight or less, more preferably about 1.2 percent by weight or less and most preferably about 0.8 percent by weight or less. As used herein "polarity" refers to the impact of the presence of polar groups in the backbone of the prepolymer. It is also understood that a small amount of other polyols may be used to form the isocyanate terminated prepolymer such as a polyester polyol, including, for example, those known in the art. Typically, such other polyols may be present in an amount of about up to 5% by weight of the polyols used to make said prepolymer. However, said prepolymer may be made in the absence of such polyols.

The polyols are present in an amount sufficient to react with most of the isocyanate groups of the isocyanates leaving enough isocyanate groups to correspond with the desired free isocyanate content of the isocyanate terminated prepolymer. Preferably, the polyols are present in an amount of about 30 percent by weight or greater based on the prepolymer, more preferably about 40 percent by weight or greater and most preferably about 55 percent by weight or greater. Preferably, the polyols are present in an amount of about 75 percent by weight or less based on the prepolymer, more preferably about 65 percent by weight or less and most preferably about 60 percent by weight or less.

Generally, it is preferred that the isocyanate terminated prepolymer is linear (i.e., formed from diols), but may be formed using diols or triols or higher order polyols to enhance crosslinking of the adhesive composition. The weight ratio of diol to triol when triols are present is about 0.8 or greater and more preferably about 0.85 or greater and most preferably about 0.9 or greater to about 0.98.

The isocyanate terminated prepolymers have a number average molecular weight of 4,000 to about 60,000 g/mole. The "molecular weight average" used herein is the number average molecular weight ($M_n$) as defined on page 189 of Textbook of Polymer Science $3^{rd}$ Edition, Billmeyer, F. W. Jr., John Wiley and Sons, NY, NY, 1984. Desirably, the $M_n$ average may be at least: 6,000; 8,000; 10,000; and 15,000 to at most about 50,000 or about 40,000.

The isocyanate prepolymer may be prepared by any suitable method, such as reacting the aforementioned polyols with an excess over stoichiometry of the polyisocyanates under reaction conditions sufficient to form a prepolymer having isocyanate functionality and free isocyanate content described above. Illustrative processes for the preparation of the isocyanate prepolymers are disclosed in U.S. Pat. No. 5,922,809 at column 9, lines 4 to 51.

The reaction of the OH terminated polyoxyalkylene with the isocyanate terminated prepolymer to form the silyl terminated prepolymer is generally carried out under an excess amount of OH terminated polyoxyalkylene is used to ensure all the NCO of the isocyanate terminated prepolymer has been reacted with OH. Typically, the molar excess of OH to NCO is 1.01, 1.02 or 1.05 to 1.2, 1.15 or 1.1. Generally, the NCO is fully reacted when no NCO is detected by using Karl Fisher titration or no NCO peak is detected by infrared spectroscopy such as Fourier Transform infrared spectroscopy (FTIR).

Generally, the time is as short as practicable such as several minutes to 24 hours or several hours. Typically, the temperature is at least about 20, 30, 40, 50 to about 100, 80, or 70° C. The atmosphere may be any suitable so long as it is sufficiently dry to essentially avoid reaction of the isocyanate with water. Generally, the atmosphere used may be vacuum, dry air, inert gas, including nitrogen or combination thereof.

The silyl terminated prepolymer is preferably linear, but may be branched as described for the isocyanate terminated prepolymer. The silyl terminated prepolymers have a molecular weight average between 8,000 to about 80,000 g/mole. The "molecular weight average" used in this paragraph is the number average molecular ($M_n$) as defined on page 189 of Textbook of Polymer Science, $3^{rd}$ Edition, Billmeyer, F. W. Jr., John Wiley and Sons, NY, N.Y., 1984. Desirably, the $M_n$ average is at least in ascending desirability: 20,000, 30,000, 40,000, 50,000 and 55,000 to at most about 70,000 or even at most about 65,000.

The silyl terminated prepolymer generally exhibits a viscosity that is about 100,000 centipoise (100 Pa s) or less and more preferably about 50,000 centipoise (50 Pa s) or less, and most preferably about 30,000 centipoise (30 Pa s) or less and about 1,000 centipoise (1 Pa s) or greater. The viscosity used herein is Brookfield viscosity determined using a number 6 spindle. The viscosity of the adhesive can be adjusted with fillers, although the fillers generally do not improve the green strength of the final adhesive. Below about 1,000 centipoise (1 Pa s), the adhesive prepared from the prepolymer may exhibit poor green strength. Above about 100,000 centipoise (100 Pa s), the prepolymer may be unstable, hard to dispense or gel.

Surprisingly, when forming the silyl terminated prepolymer by the method of this invention, the amount of undesirable isocyanate side reactions that deleteriously affect the properties of the adhesive are avoided. For example, the amount of allophonates, biuret and urea formed is less than 100 ppm. It is important to avoid these, because they tend to cause the adhesive composition to have an undesirably high viscosity and reduced elongation. Preferably, the amount of these side reaction groups is at most 0.1%, 0.5% to essentially none being present. Typically, the amount of these side reaction groups may be determined by known infrared spectroscopy techniques.

The adhesive composition of the invention comprises the silyl terminated prepolymer, filler and a catalyst. The filler may be any fillers suitable for use in adhesive compositions such as those known in the art. Illustratively, the filler may be a hydrophilic, hydrophobic filler of combination thereof. The total amount of filler present in the adhesives composition is generally from about 25% to 50% by weight of the adhesive composition. Desirably as least some portion of the filler is a carbon black. "Standard carbon black" is carbon black which is not specifically surface treated or oxidized to render it nonconductive. One or more nonconductive carbon blacks may be used in conjunction with the standard carbon black, although such inclusion may add unnecessary costs. The amount of carbon black in the composition is that amount which provides the desired color, viscosity, sag resistance and strength and generally is within the aforementioned range.

The carbon blacks depending on their structure may range over a wide range of structures as given by oil absorption number (ASTM D-2414-09). For example, the carbon black typically should be an oil absorption number (OAN) of about 80 to 200 ccs per 100 grams. Preferably, the oil absorption of the carbon is at least about 90, more preferably at least about 100, and most preferably at least about 110 to preferably at most about 180, more preferably at most about 165 and most preferably at most about 150 ccs/100 grams. In addition, the carbon black desirably has an iodine number that is at least 80. The iodine number is related to the surface area of the carbon black, but also to the presence of volatile species such as unsaturated oils and, sulfur containing compounds. The iodine number is determined using ASTM D1510-11.

Carbon blacks useful in the composition include, for example, RAVEN™ 790, RAVEN™ 450, RAVEN™ 500, RAVEN™ 430, RAVEN™ 420 and RAVEN™ 410 carbon blacks available from Colombian and CSX™ carbon blacks available from Cabot, and PRINTEX™ 30 carbon black available from Degussa. Nonconductive carbon blacks are well known in the art and include RAVEN™ 1040 and RAVEN™ 1060 carbon black available from Colombian.

Other fillers may also be used alone or in combination with carbon black. For example, other hydrophilic fillers may be used in combination with carbon black. A suitable hydrophilic filler is clay. Typically, the clay has a specific surface area of at least 5 $m^2/g$. Clays useful in the invention include kaolin, surface treated kaolin, calcined kaolin, aluminum silicates and surface treated anhydrous aluminum silicates. The clays can be used in any form which facilitates formation of the adhesive composition with the desired properties. Preferably, the clay is admixed in the form of pulverized powder, spray-dried beads or finely ground particles. It is also desirable for the clay to be calcined (heat treated to remove or reduce the hydrated water of the clay). An example of a suitable clay is Polestar 200R (IMERYS) with an average particle size of about 2 micrometers, and a BET surface of 8.5 $m^2/g$.

In a preferred embodiment, it may be advantageous to have an additional hydrophobic filler in combination with the hydrophilic filler. Hydrophobic fillers are fillers that have been hydrophobically modified. Modifications include coatings with organosilanes or fatty acids. "Hydrophobic filler" used herein is generally precipitated calcium carbonate with spherical morphology, coated with fatty acids. The coating level is approx. 1-5%. It has been discovered that the hydrophobic filler when present in a sufficient amount, may improve one or more properties such as the shear modulus obtained without loss in the impact resistance. Generally, the hydrophobic filler is present in an amount that is from greater than 0% to 50% by weight of the total amount of hydrophilic filler and hydrophobic filler (not including carbon black). Preferably, the amount is from 5%, 10% or 15% to 40% or 35%.

An example of a suitable hydrophobic filler is calcium carbonate that has been treated to render it hydrophobic, which is well known in the art. Hydrophobic calcium carbonates illustratively are typically treated/coated with organic acids or esters of organic acids to render them hydrophobic. Examples of suitable hydrophobic fillers include those available from Shiraishi Kogyo Kaisha LTD. under the tradename HAKEUNKA and M.P.I. Pharmaceutica GmBH, Hamburg, Germany. Another illustrative hydrophobic filler may be fumed silica such as those available from Wacker Chemie AG, Munich, Germany.

The adhesive also contains a catalyst which catalyzes the reaction of the hydrolyzable silane moieties with water such as those known in the art. Exemplary catalysts include: titanic acid esters (e.g., tetrabutyl titanate and tetrapropyl titanate); organotin compounds (e.g., dibutyltin dilaurate, dibutyltin maleate, dibutyltin diacetate, tin octylate tin naphthenate, reaction products of dibutyltin oxide and phthalic acid esters, dialkyltin diacetyl acetonates such as, dibutyltin bis(acetylacetonate)). More preferably, the catalyst is a dialkyltin oxide; such as dibutyltin oxide; dialkyltin bisacetyl acetonate; or the reaction product of diakyltin oxide with a phthalic ester or pentanedione.

The catalyst is present in an amount of about 60 parts per million or greater based on the total weight of the adhesive composition, more preferably 120 parts by million or greater. The catalyst is present in an amount of about 2 percent or less based on the weight of the adhesive, more preferably 1.5 percent by weight or less, and most preferably 0.5 percent by weight or less.

The compositions of this invention may further comprise plasticizers so as to modify the rheological properties to a desired consistency. Such materials should be free of water, inert to isocyanate groups and compatible with a polymer. The compositions of the invention preferably comprise two plasticizers with one being a high polar plasticizer and one being a low polar plasticizer. A high polar plasticizer is a plasticizer with a polarity greater than the polarity of the aromatic diesters, such as the phthalate esters. A low polar plasticizer is a plasticizer which has a polarity the same as or less than the aromatic diesters.

Suitable high polar plasticizers include one or more of alkyl esters of sulfonic acid, alkyl alkylethers diesters, polyester resins, polyglycol diesters, polymeric polyesters, tricarboxylic esters, dialkylether diesters, dialkylether aromatic esters, aromatic phosphate esters, and aromatic sulfonamides. More preferred high polar plasticizers include aromatic sulfonamides, aromatic phosphate esters, dialkyl ether aromatic esters and alkyl esters of sulfonic acid. Most preferred high polar plasticizers include alkyl esters of sulfonic acid and toluene-sulfamide. Alkyl esters of sulfonic acid include alkylsulphonic phenyl ester available from Lanxess under the trademark MESAMOLL. Aromatic phosphate esters include PHOSFLEX™ 31 L isopropylated triphenyl phosphate ester, DISFLAMOLL™ DPO diphenyl-2-ethyl hexyl phosphate, and DISFLAMOL™ TKP tricresyl phosphate. Dialkylether aromatic esters include BENZOFLE™ 2-45 diethylene glycol dibenzoate. Aromatic sulfonamides include KETJENFLE™ 8 o and p, N-ethyl toluenesulfonamide.

Suitable low polar plasticizers include one or more aromatic diesters, aromatic triesters, aliphatic diesters, epoxidized esters, epoxidized oils, chlorinated hydrocarbons, aromatic oils, alkylether monoesters, naphthenic oils, alkyl monoesters, glyceride oils, parraffinic oils and silicone oils. Preferred low polar plasticizers include alkyl phthalates, such as diisononyl phthalates, dioctylphthalate and dibutylphthalate, partially hydrogenated terpene commercially available as "HB-40", epoxy plasticizers, chloroparaffins, adipic acid esters, castor oil, toluene and alkyl naphthalenes. The most preferred low polar plasticizers are the alkyl phthalates.

The amount of low polar plasticizer in the adhesive composition is that amount which gives the desired rheological properties and which is sufficient to disperse the catalyst in the system. The amounts disclosed herein include those amounts added during preparation of the prepolymer and during compounding of the adhesive. Preferably, low polar plasticizers are used in the adhesive composition in an amount of about 5 parts by weight or greater based on the weight of the adhesive composition, more preferably about 10 parts by weight or greater, and most preferably about 18 parts by weight or greater. The low polar plasticizer is preferably used in an amount of about 40 parts by weight or less based on the total amount of the adhesive composition, more preferably about 30 parts by weight or less and most preferably about 25 parts by weight or less.

The amount of high polar plasticizer in the adhesive composition is that amount which gives the desired rheological properties and the acceptable sag and string properties. Preferably, the high polar plasticizers are used in the adhesive composition in an amount of about 0.2 parts by weight or greater based on the weight of the adhesive composition, more preferably about 0.5 parts by weight or greater, and most preferably about 1 part by weight or greater. The high polar plasticizer is preferably used in an amount of about 20 parts by weight or less based on the total amount of the adhesive composition, more preferably about 12 parts by weight or less and most preferably about 8 parts by weight or less.

The adhesive composition of this invention may further comprise stabilizers, which function to protect the adhesive composition from moisture, thereby inhibiting advancement and preventing premature crosslinking of the silyl terminated prepolymers in the adhesive composition. Stabilizers known to the skilled artisan for moisture curing adhesives may be used. Included among such stabilizers are diethylmalonate, alkylphenol alkylates, paratoluene sulfonic isocyanates, benzoyl chloride and orthoalkyl formates. Such stabilizers are preferably used in an amount of about 0.1 parts by weight or greater based on the total weight of the adhesive composition, preferably about 0.5 parts by weight or greater and more preferably about 0.8 parts by weight or greater. Such stabilizers are used in an amount of about 5.0 parts by weight or less based on the weight of the adhesive composition, more preferably about 2.0 parts by weight or less and most preferably about 1.4 parts by weight or less.

The adhesive composition may further comprise a hydrophilic material that functions to draw atmospheric moisture into the composition. This material enhances the cure speed of the formulation by drawing atmospheric moisture to the composition.

Preferably, the hydrophilic material is a liquid. Among preferred hydroscopic materials are pyrolidinones such as 1 methyl-2-pyrolidinone, available from under the trademark M-PYROL. The hydrophilic material is preferably present in an amount of about 0.1 parts by weight or greater and more preferably about 0.3 parts by weight or greater and preferably about 1.0 parts by weight or less and most preferably about 0.6 parts by weight or less.

Other components commonly used in adhesive compositions may be used in the composition of this invention. Such materials include those known in the art and may include ultraviolet stabilizers and antioxidants and the like.

As used herein, all parts by weight relative to the components of the adhesive composition are based on 100 total parts by weight of the adhesive composition.

The adhesive composition of this invention may be formulated by blending the components together using means well known in the art. Generally, the components are blended in a suitable mixer. Such blending is preferably conducted in an inert atmosphere in the absence of oxygen and atmospheric moisture to prevent premature reaction. In embodiments, it may be advantageous to add any plasticizers to the reaction mixture for preparing the silyl terminated prepolymer so that such mixture may be easily mixed and handled. Alternatively, the plasticizers can be added during blending of all the components. Once the adhesive composition is formulated, it is packaged in a suitable container such that it is protected from atmospheric moisture and oxygen. Contact with atmospheric moisture and oxygen could result in premature crosslinking of the silyl terminated prepolymer.

The adhesive composition of the invention is used to bond a variety of substrates together as described hereinbefore. The composition can be used to bond porous and nonporous substrates together. The adhesive composition is applied to a substrate and the adhesive on the first substrate is thereafter contacted with a second substrate. In preferred embodiments, the surfaces to which the adhesive is applied are cleaned and primed prior to application, see for example, U.S. Pat. Nos. 4,525,511; 3,707,521 and 3,779,794; relevant parts of all are incorporated herein by reference. Generally, the adhesives of the invention are applied at ambient temperature in the presence of atmospheric moisture. Exposure to atmospheric moisture is sufficient to result in curing of the adhesive. Curing can be accelerated by the addition of additional water or by applying heat to the curing adhesive by means of convection heat, microwave heating and the like. Preferably, the adhesive of the invention is formulated to provide a working time of about 6 minutes or greater, and more preferably about 12 minutes or greater. Preferably, the working time is about 60 minutes or less and more preferably about 30 minutes or less.

The adhesive composition is preferably used to bond glass or plastic coated with an abrasion resistant coating, to other substrates such as bare or painted metals or plastics. In a preferred embodiment, the first substrate is a glass, or plastic coated with an abrasion resistant coating, and the second substrate is a window frame. In another preferred embodiment, the first substrate is a glass, or plastic coated with an abrasion resistant coating, and the second substrate is a window frame of an automobile. Preferably, the glass window is cleaned and has a glass primer applied to the area to which the adhesive is to be bonded. The plastic coated with an abrasion resistant coating can be any plastic which is clear, such as polycarbonate, acrylics, hydrogenated polystyrene or hydrogenated styrene conjugated diene block copolymers having greater than 50 percent styrene content. The coating can comprise any coating which is abrasion resistant such as a polysiloxane coating. Preferably, the coating has an ultraviolet pigmented light blocking additive. Preferably, the glass or plastic window has an opaque coating disposed in the region to be contacted with the adhesive to block UV light from reaching the adhesive.

In a preferred embodiment, the composition of the invention is used to replace windows in structures or vehicles and most preferably in vehicles. The first step is removal of the previous window. This can be achieved by cutting the bead of the adhesive holding the old window in place and then removing the old window. Thereafter, the new window is cleaned and primed. The old adhesive that is located on the window flange can be removed, although it is not necessary and in most cases it is left in place. The window flange is preferably primed with a paint primer. The adhesive is applied in a bead to the periphery of the window located such that it will contact the window flange when placed in the vehicle. The window with the adhesive located thereon is then placed into the flange with the adhesive located between the window and the flange. The adhesive bead is a continuous bead that functions to seal the junction between the window and the window flange. A continuous bead of adhesive is a bead that is located such that the bead connects at each end to form a continuous seal between the window and the flange when contacted. Thereafter the adhesive is allowed to cure.

In another embodiment, the compositions of the invention can be used to bond modular components together. Examples of modular components include vehicle modules, such as door, window or body.

Illustrative Embodiments of the Invention

The following examples are provided to illustrate the invention, but are not intended to limit the scope thereof. All parts and percentages are by weight unless otherwise indicated.

Test Methods

Quick Knife Adhesion Test:

A 6.3 mm (width)×6.3 mm (height)×76.2 mm (length) size sealant bead was placed on 101.6 mm×101.6 mm panel substrate and the assembly was cured for 7 days at 23° C. and 50 percent relative humidity (RH). The tested substrates were first cleaned with isopropanol (IPA) before applying the sealant. In addition, the adhesion was tested after curing as just described and exposing the bead to 38° C. at 100% RH for 10 days. The bead was cut with a razor blade through to the surface at 45° angle while pulling back the end of the bead at 180° angle. Notches were cut every 3 mm on the surface. The degree of adhesion was evaluated as adhesive failure (AF) and/or cohesive failure (CF). In case of adhesive failure, the cured bead separates from the surface, while in cohesive failure, the sealant itself fails. The substrates tested were aluminum alloys 5062 and 6061 and stainless steel 304 alloy with a 2B mill finish Stability Test:

The stability of the sealant on storage was determined by measuring the flow rates of a sealant before and after aging at 130° F. (54° C.) for three days. The press flow is determined as the time in seconds required to extrude 20 grams of the sealant through an orifice 0.157 inch (0.4 cm) in diameter under a pressure of 80 pounds per square inch (551 kPa). The increase in press flow after aging will indicate the stability of the sealant on storage.

Example 1

Prepolymer Mixture Preparation

In a glass reactor 1200 grams of ACCLAIM™ 8200 diol available from Bayer Material Science LLC, Pittsburgh, Pa. (hydroxyl number 14.0 mg KOH/g; viscosity 3,000 cps @ 25° C.; functionality 2; molecular weight 8,000) was added and heated to 50° C. for 15 minutes. 75 grams of ISONATE™ 125M, available from The Dow Chemical Company, Midland, Mich. (MDI mixture of approximately 98 percent 4,4'-diphenylmethane diisocyanate and 2 percent 2,4'-diphenylmethane diisocyanate) was added and mixed well at 50° C. then 0.01 grams of DABCO™ T-9 catalyst, available from Air Products and Chemicals, Inc., Allentown, Pa. (Stannous Octoate) was added into the mixture and an exotherm was observed. The reaction was continued for 2 hrs at 50° C. to form the isocyanate terminated prepolymer. The initial NCO concentration and final NCO concentration was 1.433% 0.865% as determined by Karl Fisher titration.

An OH terminated polyoxyalkylene, (polyoxyalkylene prepolymer terminated by a hydrolyzable silane and a hydroxyl group having a mol. wt ~1000 grams) was made by the method described at paragraph 61 of WO 2012/003187. To the isocyanate terminated prepolymer, 92.3 grams of the OH terminated polyoxyalkylene was added to and reacted for 4 hrs and 60° C. The resultant silyl terminated prepolymer (SMP) had zero % NCO. The viscosity of silyl terminated prepolymer was 15,000 centipoise measured using a Brookfield viscometer employing a #6 spindle at 12 rpm at 23° C.

Example 2

The prepolymer (SMP) of Example 1 was then compounded into an adhesive composition as follows. Prior to compounding the ingredients as shown in Tables 1 and 2, the fillers were dried overnight as 110° C. (at least 16 hours). The prepolymer was mixed with the plasticizer for 15 minutes under vacuum to degas the mixture. The dried fillers were then added and mixed for 2 minutes and the mixture was scraped down into the mixer. The mixture was mixed a further 30 minutes under vacuum. The silane adhesion promoter, drying agent and UV stabilizer was added and the mixture mixed for 20 minutes under a vacuum. Finally, the catalyst was added and the mixture was mixed for 15 minutes under a vacuum to form the adhesive composition. The properties of the adhesive composition are shown in Table 3.

Comparative Examples 1-3

Adhesive compositions were made in the same way as for Example 2 with the prepolymer(s) (SMPs) shown in Table 2 and further described below. The SMP used in Comparative Example 1 was Kaneaka S303H SMP. This SMP is based on a triol having a molecular weight of 10,000-12000 g/mol. This resin has a very low viscosity. The SMP used in Comparative Example 2 was SPUR 1015LM available from Momentive Performance Materials Inc., Columbus, Ohio. It is a trimethoxysilyl terminated polyurethane prepolymer. It's based on 10,000-12,000 molecular weight polyol reacted with isocyanatosilane and resin is free of plasticizer. The SMP used in Comparative Example 3 was a silane terminated polymer available from Bayer under the tradename DEMOSEAL XP 2636, which is a reaction product of isocyanate terminated prepolymer fully capped with propyltrimethoxy amino silane. Comparative Example 4 used SMPs available from The Dow Chemical Company, under the designations XMX 603 and XMX 602, which are silyl modified polyurethanes based upon a triol and silyl modified polyurethane based upon a diol respectively and formed as described in WO2012/003187. The properties of the adhesive compositions are shown in Table 3.

Adhesives useful for bonding glass such as windshields into car bodies or buildings require multiple at times contradicting characteristics, such as the ability to easily dispense, but maintain the dispensed shape (bead), high strength, but be sufficiently elastomeric to cushion the brittle glass from vibration, sufficient working time to dispense the bead, but quick curing or tack free time to allow for quick drive away of a repaired vehicle. Ultimately, the adhesive must adequately bond to the substrate to guard against simply separating from the substrate. From Table 3, it can be seen that the adhesive (Example 2) made from the prepolymer of Example 1 displays improved adhesive properties compared to the other SMP adhesive compositions to a variety of substrates. Likewise, the Example adhesive accomplishes this while achieving low viscosity, short tack free time and good strength overall compared to the Comparative adhesives.

TABLE 1

| Ingredient | Description | Supplier |
| --- | --- | --- |
| S303H | Silyl terminated prepolymer (~10,000 Mn) | Kaneka |
| SPUR 1015LM | trimethoxysilyl terminated polyurethane prepolymer | Momentive |
| DEMOSEAL XP 2636 | reaction product of isocyanate terminated prepolymer capped with proplytrimethoxy amino silane | Bayer |
| Dow XMX 603 | Silyl modified polyurethanes (triol based resin) | The Dow Chemical Co. |
| Dow XMX 602 | Silyl modified polyurethane prepolymer (diol based resin) | The Dow Chemical Co. |
| Silquest A-171 | Vinyl trimethoxysilane drying agent | Momentive |
| Silquest A-1170 | Bisamino hexamethoxypropyl silane adhesion promoter | Momentive |
| CAB-O-SIL 720 | Fumed silica filler | Cabot |
| Tipure | Titanium oxide filler | DuPont |
| Immerseal 75 | Calcium Carbonate filler | Imerys |
| Pal N | Phthalate plasticizer | BASF |
| UV stabilizer | hindered amine UV light stabilizer | Ciba |
| Neostan U220 | Dibutyl tin bis (acetylacetonate) Tin catalyst | Kaneka |

TABLE 2

| Adhesive Formulation | Comp. Ex. 1 | Comp. Ex. 2 | Comp. Ex. 3 | Comp. Ex. 4 | Example 2 |
| --- | --- | --- | --- | --- | --- |
| S303H | 32.84 | 0 | 0 | 0 | 0 |
| SPUR 1015LM | 0 | 32.84 | 0 | 0 | 0 |
| Desmoseal XP 2636 | 0 | 0 | 32.84 | 0 | 0 |
| Dow XMX 603 (triol based SMP resin) | 0 | 0 | 0 | 10.94 | 0 |
| Dow XMX 602 (diol based SMP resin) | 0 | 0 | 0 | 21.9 | 0 |
| Example 1 silyl prepolymer | 0 | 0 | 0 | 0 | 32.84 |
| Silquest A-171 | 0.7 | 0.75 | 0.75 | 0.75 | 0.75 |
| Silquest A1170 | 0.45 | 0.41 | 0.41 | 0.41 | 0.41 |
| CAB-O-SIL 720 | 3.5 | 3.5 | 3.5 | 3.5 | 3.5 |
| TITANIUM DIOXIDE | 11.6 | 11.6 | 11.6 | 11.6 | 11.6 |
| Immerseal 75 | 43.9 | 43.9 | 43.9 | 43.9 | 43.9 |
| Pal N | 6 | 6 | 6 | 6 | 6 |
| UV stabilize | 0.75 | 0.7 | 0.7 | 0.7 | 0.7 |
| Neostan U220 | 0.3 | 0.3 | 0.3 | 0.3 | 0.3 |
| Total | 100.0 | 100.0 | 100.0 | 100.0 | 100.0 |

All quantities are parts by weight.

TABLE 3

| Property | Comparative Example 1 | Comparative Example 2 | Comparative Example 3 | Comparative Example 4 | Example 2 |
|---|---|---|---|---|---|
| Density (LB/Gal) | 13.0 | 13.4 | 13.5 | 13.2 | 13.3 |
| Viscosity (press flow @ 0.104 inch orifice) at room temp. | 23 | 120 | 119 | 50 | 49 |
| Tack Free Time @ 23° C./50RH (min) | 50 | 52 | 20 | 60 | 45 |
| Tensile strength, psi (ASTM D412) | 305 | 385 | 223 | 232 | 289 |
| Elongation at break, % (ASTM D412) | 373 | 848 | 451 | 266 | 606 |
| Tear strength, pli (ASTM D624C) | 12 | 9 | 8 | 3 | 9 |
| Shore A hardness | 40 | 40 | 50 | 38 | 30 |
| Adhesion Properties | | | | | |
| Initial after 10 days cure | | | | | |
| Aluminum 5062 | 90CF | 0CF | 75CF | 80CF | 100CF |
| Aluminum 6061 | 25CF | 0CF | 0CF | 70 | 50CF |
| Stainless steel 28 mil | 90CF | 0CF | 50CF | 100CF | 100CF |
| 10 days at 100 F./100% RH | | | | | 100CF |
| Aluminum 5062 | 90CF | 70-80CF | 90CF | 100CF | 100CF |
| Aluminum 6061 | 100CF | 0CF | 100CF | 100CF | 100CF |
| Stainless steel 28 mil | 100CF | 100CF | 100CF | 100CF | 100CF | pli = pounds/inch (thickness)
CF- ohesive failure

What is claimed is:

1. An adhesive composition comprising:
   a) a silyl terminated prepolymer having a number molecular weight average (Mn) of about 8,000 to about 80,000 g/mole and being comprised of:
      (i) a polymeric backbone of alkylene oxide and at least three and at most six urethane groups, and
      (ii) at least two terminal groups comprised of a silicon atom having at least two alkoxy silane groups, wherein each silicon atom in the terminal groups is separated from the urethane groups in the polymeric backbone by an amount of alkylene oxide that has a molecular weight of 200 to 15,000 g/mole,
   wherein the silyl terminated prepolymer is linear;
   b) a filler, and
   c) a silanol condensation reaction catalyst;
      wherein the adhesive composition is useful in a pumpable adhesive that maintains its dispensed shape for bonding glass to a substrate.

2. The adhesive composition of claim 1 further comprising an adhesion promoter.

3. The adhesive composition of claim 2 further comprising a plasticizer.

4. The adhesive composition of claim 1, wherein each of the urethane groups in the polymeric backbone of alkylene oxide is separated from each other by an amount of alkylene oxide having a molecular weight of 1,000 to 12,000 g/mole.

5. The adhesive composition of claim 1, wherein there is at most a trace amount of side isocyanate reaction groups selected from the group consisting of allophonate, biuret and urea.

6. The adhesive composition of claim 4, wherein said amount of alkylene oxide separating the urethane groups has a molecular weight from of 1,200 to 10,000 g/mole.

7. The adhesive composition of claim 1, wherein said amount of alkylene oxide separating each silicon atom from the urethane groups is from 500 to 1,000 g/mole molecular weight.

8. The adhesive composition claim 1, wherein the catalyst is catalyst.

9. The adhesive composition of claim 1, wherein the silyl terminated prepolymer has a number average molecular weight of 8,000 to 40,000.

10. A method of bonding two or more substrates together comprising;
    (i) delivering the adhesive composition of claim 1 to an application nozzle,
    (ii) applying a bead of the adhesive composition from step (i) through the application nozzle on to at least a portion of at least one of the substrates,
    (iii) contacting the substrates to be bonded, and
    (iv) allowing the adhesive composition to moisture cure.

11. The method of claim 10 wherein at least one of the substrates is window glass.

12. A method according to claim 11 wherein at least one of the other substrates is a building or a vehicle.

13. The adhesive composition of claim 1, wherein the silyl terminated prepolymer exhibits a viscosity of about 1,000 centipoise or greater and about 30,000 centipoise or less at 23° C.

14. The adhesive composition of claim 1, wherein the glass is window glass and the substrate is a building or a vehicle.

* * * * *

UNITED STATES PATENT AND TRADEMARK OFFICE
CERTIFICATE OF CORRECTION

PATENT NO. : 9,765,247 B2
APPLICATION NO. : 14/467746
DATED : September 19, 2017
INVENTOR(S) : Mahdi et al.

It is certified that error appears in the above-identified patent and that said Letters Patent is hereby corrected as shown below:

In the Claims

Column 16, Line 30-31 Claim 8:
Insert --tin-- after "wherein the catalyst is"

Signed and Sealed this
Twenty-ninth Day of May, 2018

Andrei Iancu
*Director of the United States Patent and Trademark Office*